United States Patent [19]
Ritter

[11] Patent Number: 5,724,380
[45] Date of Patent: Mar. 3, 1998

[54] RADIO TRANSMISSION SYSTEM

[75] Inventor: Gerhard Ritter, Thaining, Germany

[73] Assignee: Siemens Aktiengesellschaft, Munich, Germany

[21] Appl. No.: 449,791

[22] Filed: May 24, 1995

[30] Foreign Application Priority Data

Jun. 6, 1994 [DE] Germany ............... 44 19 749.7

[51] Int. Cl.$^6$ ............... H04B 15/00; H04K 1/00; H04L 27/30
[52] U.S. Cl. ............... 375/202; 375/299; 455/179.1; 455/509; 455/62; 455/515
[58] Field of Search ............... 375/202, 275, 375/299; 455/34.1, 62, 179.1, 509, 515

[56] References Cited

U.S. PATENT DOCUMENTS

| | | | |
|---|---|---|---|
| 5,203,012 | 4/1993 | Patsiokas et al. | 455/34.1 |
| 5,212,831 | 5/1993 | Chuang et al. | 455/54.1 |
| 5,239,676 | 8/1993 | Strawczynski et al. | 455/33.2 |
| 5,263,176 | 11/1993 | Kojima et al. | 455/34.1 |
| 5,345,597 | 9/1994 | Strawczynski et al. | 455/34.1 |
| 5,396,649 | 3/1995 | Hamabe | 455/34.1 |
| 5,483,666 | 1/1996 | Yamada et al. | 455/33.1 |
| 5,497,505 | 3/1996 | Koohgoli et al. | 455/34.1 |

Primary Examiner—Stephen Chin
Assistant Examiner—Mohammad Ghayour
Attorney, Agent, or Firm—Hill, Steadman & Simpson

[57] ABSTRACT

A radio transmission system is disclosed for use in wireless local loop and hand-held applications which employs an intelligent frequency hopping method whereby the optimum frequencies for a transmission from or, respectively, to the subscriber stations are determined for every transmission direction and a corresponding, optimum allocation of the frequencies to the connections is made.

5 Claims, 1 Drawing Sheet

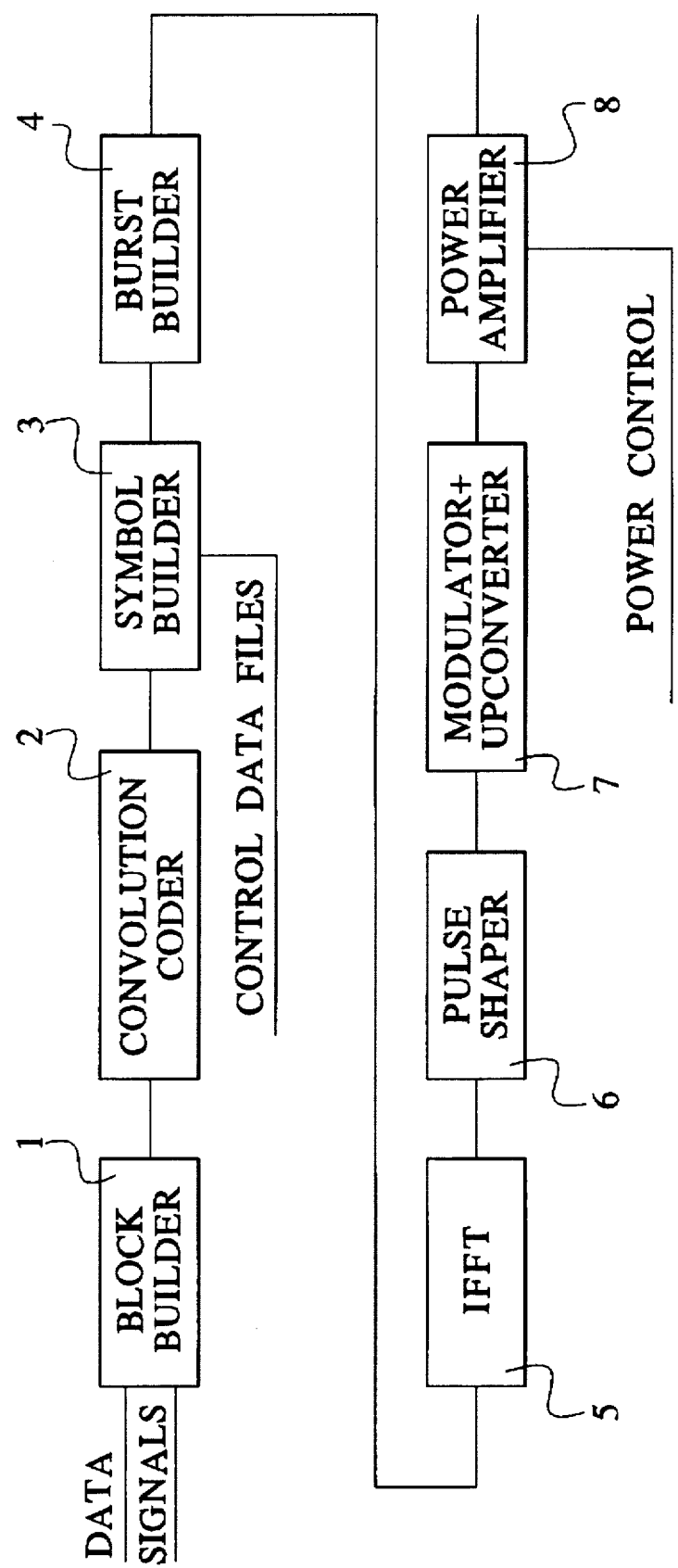

RADIO TRANSMISSION SYSTEM

BACKGROUND OF THE INVENTION

1. Field of the Invention

The present invention relates generally to a radio transmission system and, more particularly, the present invention relates to a radio transmission system having at least one stationary radio station and a plurality of mobile radio stations (subscriber devices) and radio transmission channels.

2. Description of the Related Art

The air interface represents the critical bottleneck in every mobile radio telephone system due to its physical limitations. A system can be decisively improved and optimized only by an optimization of this air interface. Greater degrees of freedom exist for the other system components and these can be utilized for optimization. It is known that narrowband systems are less complex but, on the other hand, they exhibit deterioration of performance under fading conditions. Broadband systems achieve better performance under fading conditions but are more complex.

When the transfer characteristic of a transmission channel is considered in the frequency domain, pronounced maximums and minimums can be seen. One is more successful in averaging these fluctuations in the frequency domain, the more broadband a system is.

Narrowband systems are subject to great fluctuations between the maximums and minimums. An optimum frequency for which the attenuation is lowest can be specified for every connection dependent on the momentary transmission channel. This attenuation minimum is dependent on the width of the frequency band under consideration. This minimum allows significantly lower attenuations than those that occur for the average.

When there are a plurality of radio connections to a base station, then the transmission channels between the individual subscribers are statistically independent. The optimum frequency for every connection can thus be specified for immobile subscribers. The rate of change of the respective transmission channels increases with increasing speed of the subscribers. At low speeds such as, for example, hand-held applications, a quasi-stationary behavior of the transmission channels remains appropriate for a comparatively long time.

The invention is based on the desirable object of creating a mobile radio telephone system for wireless subscriber connections and for hand-held applications that advantageously utilizes the above-mentioned conditions. This system will enhance the overall transmission quality, power consumption and noise immunity while reducing the complexity and, thus, the costs on the basis of a small momentary bandwidth.

In a radio transmission system of the type initially set forth above, this object is inventively achieved by an intelligent frequency hopping method, whereby the optimum frequencies for transmission from or, respectively, to the subscriber stations are identified for each transmission direction. A corresponding, optimum allocation of the frequencies to the connections ensues.

The system of the present invention, can cover a relatively broad spectrum of applications and also allows use with ISDN and ATM systems in addition to the standard applications such as voice and data transmission. It is distinguished by high flexibility in data rates and spectral efficiency with low system requirements. As a result of the intelligent frequency hopping method, considerable gains are achieved at the air interface compared with previous, conventional system designs that attempt to achieve improvements via broadband transmission methods or statistical methods such as frequency hopping. This is true both of Rayleigh fading as well as interference from neighboring cells. Additionally, the system is optimized to reduce system requirements particularly on the analog side.

The invention is set forth in greater detail below with reference to an exemplary embodiment shown in the drawing.

SUMMARY OF THE INVENTION

The use of a greater number of narrowband transmission channels is important for achieving desirable system properties. Measuring statistics in every subscriber station MS are required for determining the level and the disturbances on all of these channels. It is also significant that an extremely fast frequency change is possible. The use of a digital FFT (fast fourier transform) and IFFT (inverse fast fourier transform) at the receiver or, respectively, transmission side is provided for this purpose. A single FFT unit can thereby be switched between the two operating modes, FFT and IFFT by selecting an appropriate parameter. The FFT undertakes a transformation from the time domain into the frequency domain and the IFFT undertakes the inverse transformation from the frequency domain into the time domain. Due to savings in the calculating outlay, the FFT and IFFT are essentially limited to powers of 2. When an IFFT with 128 discrete input frequencies is assumed as an example for the downlink at the base station BS side, a complex quantity corresponding to the amplitude and the phase position must be respectively generated for the input frequencies. Then this IFFT supplies the corresponding time signal that must be brought into the corresponding frequency position via D/A conversion and an upshift mixing. A maximum of 128 discrete frequencies whose amplitudes and phases are defined by the values applied to the IFFT are then obtained in the output signal. At the reception side, i.e. the subscriber terminal MS all 128 frequencies are converted into one baseband or a low intermediate frequency, and are A/D-converted and subsequently supplied to an FFT unit for processing. The amplitudes and the phases of the 128 input frequencies are recovered at the output of this FFT unit. Transmission can thus ensue on one or more of the 128 frequencies. A flexible matching of the data rate is thus possible with this method depending on how many frequencies are employed for a connection. It also allows an extremely fast frequency change since the information provided for a connection is merely applied to the corresponding input of the IFFT via a digital multiplexer and then taken from the output of the FFT at the reception side. The amplitude information for all frequencies is available at the side of the subscriber terminal MS and the frequency which is received with the maximum level can be readily determined. Pure phase modulation is employed in order to avoid a corruption of the amplitude information due to modulation.

In the frequency hopping method of the present invention, each subscriber station MS constantly determines the suitability of all frequencies for transmission by identifying the relative scatter. To this end, the respective subscriber station MS transmits a list of the three best frequencies in every uplink burst. An attempt is made in the base station BS to determine a better allocation of the subscriber stations MS to the frequencies based on this information. When a better allocation is found, the new frequency is assigned to the affected subscriber stations MS in the next downlink burst. A dispatch table is also transmitted on the control channels, this also contains the allocation of the subscribers to frequencies.

For the adaptation of the data rate, the corresponding plurality of frequencies is assigned to a connection. The FFT processing already supplies the detected data for all frequencies from which the assigned frequencies must be selected anyway. It is thus possible to increase the data rate at the reception side in a simple way with a higher-performance channel coding. At the transmission side, modulation vectors merely have to be applied to a plurality of inputs of the IFFT. It is then a prerequisite that a linear power amplifier be used.

96 subscribers can be simultaneously supplied with 16+4 kbits/sec by a base stations with the design provided in the above-described exemplary embodiment. When 4 frequencies are assigned to all subscribers, then this number is reduced to 24 subscribers simultaneously with 64+16 kbits/sec. The overall data rate that is sequenced by a base station over the air interface amounts to 2 Mbits/sec.

This type of signal transmission allows another saving in that every mobile radio telephone channel can be described by a delay spread. Transients of this channel ensue due to the delay spread and have decayed after the duration of the delay spread. When the 128 frequencies are transmitted for the duration of the required sampling time for FFT processing plus the duration of the delay spread and they are only evaluated after the duration of the delay spread, then an equalizer is not required for the mobile radio telephone channel. This is in contrast to the GSM system which does require an equalizer. Additionally, the off-channel suppression in the FFT processing increases when all signals are placed exactly on the zero positions of the individual FFT filters. This is not established during the transient period of the channels. Transmission is possible thus without equalizers.

Utilization of the FFT at the reception side has the advantage that off-channel interference is eliminated since all FFT filters have a sinx/x characteristic and the zero locations lie on the frequencies of the off channels.

Respective IFFT processing is required for the transmission part, whereas FFT processing is necessary at the reception side. A TDD mode becomes available with the possibility of being able to employ FFT hardware for IFFT processing based on a simple parameter modification. As a result, the FFT hardware can be doubly utilized. This operating mode has the further advantage that the optimum frequency is identical for both transmission directions due to the reciprocity of the transmission channel.

Because of the relatively static character of the individual transmission links, higher level modulation methods can be applied. The transmission of individual, phase-modulated symbols thus is accomplished as the optimum transmission method.

The suppression of interference from other cells is assured, on the one hand, by the intelligent frequency hopping method that assigns the least disturbed frequency to every connection as much as possible. Further, an 8-PSK method, which is assumed here, tolerates higher noise power for a discrete disturbance than the presence of noise interference. Disturbances are mainly discrete disturbances due to the narrowband design.

BRIEF DESCRIPTION OF THE DRAWINGS

FIG. 1 illustrates a block diagram of a first exemplary embodiment of the present invention.

DESCRIPTION OF THE PRESENTLY PREFERRED EMBODIMENTS

As shown in FIG. 1, the block circuit diagram for the transmitter i.e. the base station BS is composed of the series connection of the following assemblies: block forming unit 1, convolution coder 2, symbol forming unit 3, burst forming unit 4, IFFT 5, pulse shaper 6, modulator+up-converter 7 and power amplifier 8. The traffic data of, for example, 16 kbits/sec and the traffic-related signalling of, for example, 4 kbits/sec are combined in the block forming unit 1 in the transmitter to form blocks of 120 bits. Each block is expanded by 9 tail bits in order to achieve a defined final condition for the decoder. These blocks are convolution coded with a rate of ½ and a constraint length of 9 in the convolution coder 2. The convolution-coded blocks are combined with block interleaving to form symbols of 3 bits each in the symbol forming unit 3. 83 symbols at the burst end thereby result. The burst start is formed as a prefix with 4 synchronization symbols. Additionally, signalling for the control of the air interface with 17 symbols is supplied from an executive controller 9. These symbols are inserted between the synchronization symbols and the useful symbols in the symbol forming unit 3. These symbols are not subjected to the convolution coding but are block-coded in the executive controller 9.

As mentioned above, the subscriber stations MS transmit a list of the best frequencies in every uplink burst. The base stations BS determines, i.e. by the executive controller 9, a better allocation of the subscriber stations MS to the frequencies based on the received information. The new frequencies are then assigned to the respective subscriber stations in the next downlink burst. Thus, further signaling for the control of the frequency assignment is supplied from the executive controller 9 to the burst forming unit 4. Furthermore, the dispatch table is signaled to the burst forming unit 4 for transmission on at least one control channel.

The burst formed in this way is sequentially supplied to the 128 point IFFT 5 via a multiplexer. The respective frequency derives at the output of the IFFT 5 depending on which input of the IFFT the data is applied. This is a complex vector of the amplitude 1 and a phase corresponding to the selected 8-PSK modulation (for example, Gray coding) for each symbol. Zero vectors are to be applied to the input for frequencies that are not used. A respective sine oscillation having 128 samples in the time domain and a phase corresponding to the phase of the vector applied to the input respectively results at the output.

Only one frequency is employed for pure voice transmission, for example with a standard speech coder, and vectors are applied to only one input. When a plurality of frequencies are employed, the corresponding vectors must be applied to the respective frequency inputs and correspondingly more sine oscillations with the corresponding phases result at the output.

An 8-PSK modulation is employed for the modulation, whereby respectively 3 bits are combined to a form symbol. Modulation ensues in that the complex vectors for the possible symbols are deposited in a table. This modulation table thus has a size of eight complex values, i.e. 8×2 values. The complex vector is applied to the input of the IFFT processor. A sine oscillation having a corresponding frequency and corresponding phase position is obtained at the output of the IFFT. The transmission of the sine oscillation takes longer than that which would be required for a symbol so that, on the one hand, the channel can respond and, on the other hand, a pulse shaping is undertaken in order to reduce the required bandwidth. To this end, the amplitude for all signals is simultaneous weighted with a cosine curve. At the reception side, only a portion at the end of the transmitted symbol is then interpreted. The channel has reliably responded for this portion and the modulation for the spectral shaping is not present.

A 128 point FFT or, respectively, IFFT is utilized, whereby all frequencies are not employed, for aliasing reasons. When only 100 frequencies are used, then a bandwidth of 5 Mhz is occupied. This occupied bandwidth represents the maximum bandwidth occupied by a base station BS, whereby, of course, smaller bandwidths can be used for a corresponding lower capacity of the base station BS.

A temporal interleaving is not required with this method. The corresponding delay thus does not arise. A convolution coding with the rate ½ and the constraint length 9 is provided as coding. The overall delay time is comprised of time for the coding and modulation of the data, the transmission time and the decoding time of approximately one burst duration.

Of the 100 frequencies available, 4 frequencies are used for control channels; 96 channels thus remain for traffic transmission. The control channels do not change their frequency since their information must reach all subscribers. In order to assure this result, the same information is transmitted on all control channels in the downlink. The subscriber station MS thus has the possibility of frequency diversity. In the simplest case, this is realized as a switched diversity by selecting the best frequency. In the uplink such as, for example, for random access, the subscriber station MS uses the frequency that is received with maximum level. This is then also the frequency at which maximum reception power is achieved at the base station BS. The frequencies are selected to be equidistant and thus have a spacing of 1 Mhz given an overall bandwidth of 5 Mhz for the base station BS. These frequencies are employed on the downlink for frequency correction, synchronization, control of the subscriber stations MS, statistical multiplexing and dispatch table, and are employed on the uplink for random access, call request and acknowledgement.

As shown in FIG. 1, the block circuit diagram for the subscriber station MS is composed of the series connection of the following assemblies: down converter 10, FFT unit 11 and measuring and processing unit 12.

As mentioned above, the 128 frequencies are converted into one baseband at a low intermediate frequency. This is done e.g. by the down converter 10 which supplies the received frequencies to the FFT unit 11 for processing. The FFT unit 11 supplies thus the detected data for all frequencies from which the assigned frequencies must be selected. This is done e.g. by the measuring and processing unit 12 which has a means to determine the frequency which is received with the maximum level. Every subscriber station MS is able to measure the level and disturbances on the transmission channels. Thus, the measuring and processing unit 12 supplies the best frequencies for each subscriber station MS and sends them in the next uplink burst over the radio transmission channel to the base station BS.

The individual subscriber stations are very precisely synchronized onto the base station in terms of time on the uplink. This is necessary because the signals of all subscribers are processed with a single receiver and the separation of the signals ensues in the digital FFT. Every signal must thus fall into the evaluation window as precisely as possible. The base station therefore assigns them corresponding correction values regarding the number of clocks by which their transmitter timing is to be shifted compared to the receiver timing.

For initial synchronization of the subscriber stations, the subscriber station selects the control channel that can be received best. Next, it carries out a synchronization with the symbol clock. After this, it synchronizes itself to the frame timing and releases the frequency synchronization onto the reception channel. The synchronization on the downlink is thus accomplished. The synchronization for the uplink can only be undertaken by the base station. In order for a connection with the base station to occur at all on the uplink, it is necessary that work is carried out with half the data rate for the random access burst. Data transmission is thus also possible when synchronization is not present. The base station then requests that the subscriber station transmit a synchronization burst. The data transmission in this synchronization burst ensues somewhat more slowly than in the normal burst, so that all combinations of the symbol timing and of the evaluation timing occur. The base station can identify the optimum combination and returns the required offset between transmitter timing and receiver timing to the subscriber station. The synchronization of the air interface has thus been ended. This timing information is deposited in a non-volatile memory and can be employed as a starting value for a renewed access. The actual call setup with the authentication of subscriber and base station can then begin.

Power regulation is not employed for the downlink because regulation would disturb the intelligent frequency hopping method of the present invention. Power regulation is provided for the uplink in order to reduce the level differences at the base station and to offer optimum conditions for the digital processing in the FFT.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim:

1. A radio transmission system comprising:

at least one base station and a plurality of mobile subscriber stations;

said subscriber stations each comprising means for determining a best frequency for communications with said base station and means for transmitting said best frequency over one of a plurality of radio transmission channels to said base station in an uplink burst;

said base station comprising means for receiving the best frequencies from said subscriber stations;

means for allocating said best frequencies respectively among said subscriber stations and means for assigning said best frequencies to the respective subscriber stations in a downlink burst wherein the base station further comprises a block forming unit for forming data and signaling to blocks and comprises a convolution coder for convolution coding of the blocks, wherein the base station further comprises a symbol forming unit for forming symbols by combining the convolution coded blocks with block interleving.

2. The radio transmission system of claim 1, wherein the base station further comprises a burst forming unit for forming the symbols in bursts which include the allocation of frequencies to the subscriber stations.

3. The radio transmission system of claim 1, wherein the base station further comprises an inverse fast fourier transformation unit for providing the respective frequencies at outputs depending on which inputs of the inverse fast fourier transformation the bursts are applied.

4. A radio transmission system comprising:

at least one base station and a plurality of mobile subscriber stations;

said subscriber stations each comprising means for determining a best frequency for communications with said base station and means for transmitting said best frequency over one of a plurality of radio transmission channels to said base station in an uplink burst;

said base station comprising means for receiving the best frequencies from said subscriber stations;

means for allocating said best frequencies respectively among said subscriber stations and means for assigning said best frequencies to the respective subscriber stations in a downlink burst, wherein each subscriber station further comprises a fast fourier transformation unit for providing the respective frequencies at outputs depending on which inputs of the inverse fast fourier transformation the bursts are applied.

5. The radio transmission system of claim 4, wherein the fast fourier transformation unit can be switched to an inverse fourier transformation unit by selecting an appropriate parameter.

* * * * *